US005737886A

United States Patent [19]

Kruckemeyer

[11] Patent Number: 5,737,886
[45] Date of Patent: Apr. 14, 1998

[54] METHOD FOR DETERMINING FORGERIES AND AUTHENTICATING SIGNATURES

[76] Inventor: Robert J. Kruckemeyer, 808 Travis, Suite 1700, Houston, Tex. 77002

[21] Appl. No.: 627,600

[22] Filed: Apr. 4, 1996

[51] Int. Cl.$^6$ ............................................. B42D 15/00
[52] U.S. Cl. ............................ 283/67; 283/70; 283/72
[58] Field of Search ............................. 283/67, 70, 72, 283/82, 74, 75; 380/23, 25, 26; 340/825.34

[56] References Cited

U.S. PATENT DOCUMENTS

| | | | |
|---|---|---|---|
| 4,975,969 | 12/1990 | Tal | 283/70 X |
| 5,083,814 | 1/1992 | Guinta et al. | 283/70 |
| 5,380,044 | 1/1995 | Aitkens et al. | 283/67 |
| 5,509,692 | 4/1996 | Oz | 283/70 |

*Primary Examiner*—Willmon Fridie, Jr.
*Attorney, Agent, or Firm*—David M. Ostfeld

[57] ABSTRACT

A method for deterring forgeries and authenticating signatures placed on any document or other object (collectively "Item") is disclosed. A first forgery-proof diffraction grating pattern or similar information bearing medium (Electronic Fingerprint or "EF") is issued to a person whose signature is being protected ("Principal") by a central registrar ("CR"). A personal identification number ("PIN") which has been assigned by the CR to the Principal is encoded on the EF. The PIN remains constant and is encoded on all EFs distributed to the Principal. In addition to the PIN, the EF contains another code ("Code") that is distinct for each EF distributed to the Principal. The Principal must acknowledge to the CR, through the use of his or her PIN, that he or she has received physical possession of the EFs before the EFs are considered valid. As the Item is transferred from one Holder to the next, a record of the transfer of the Item is kept by the CR which has the capacity to issue CAs to all subsequent Holders of the Item.

37 Claims, 4 Drawing Sheets

---

LAST WILL AND TESTAMENT OF ←—20
JOHN Q. PUBLIC PAGE 8

Maximum Marital Deduction Amount shall be distributed in the same manner as the residue of my estate.

7.5  References to my "Personal Items" are to all of my interest in any automobiles, clothing, jewelry, household goods, furniture and furnishings, other articles of personal use or ornament, and other personal effects of a similar nature, use or classification.

IN TESTIMONY WHEREOF, and in the presence of two Witnesses, who are acting as witnesses at my request, in my presence and in the presence of each other, I hereunto sign my name, on this the 21st day of June, 1996.

JOHN Q. PUBLIC, Testator ←—10 ←—11

←—30
←—31
←—32

The foregoing instrument was signed by the Testator in our presence and declared by him to be his LAST WILL AND TESTAMENT, an we, the undersigned Witnesses, sign our names hereunto as witnesses at the request and in the presence of the said Testator, and in the presence of each other, on this the 21st day of June, 1996.

Witness

Witness

FIG. 1

LAST WILL AND TESTAMENT OF ←—20
JOHN Q. PUBLIC PAGE 8

Maximum Marital Deduction Amount shall be distributed in the same manner as the residue of my estate.

7.5    References to my "Personal Items" are to all of my interest in any automobiles, clothing, jewelry, household goods, furniture and furnishings, other articles of personal use or ornament, and other personal effects of a similar nature, use or classification.

IN TESTIMONY WHEREOF, and in the presence of two Witnesses, who are acting as witnesses at my request, in my presence and in the presence of each other, I hereunto sign my name, on this the 21st day of June, 1996.

*John Q Public* ←—11
JOHN Q. PUBLIC, Testator ←—10

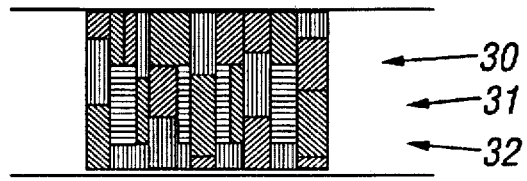
←—30
←—31
←—32

The foregoing instrument was signed by the Testator in our presence and declared by him to be his LAST WILL AND TESTAMENT, an we, the undersigned Witnesses, sign our names hereunto as witnesses at the request and in the presence of the said Testator, and in the presence of each other, on this the 21st day of June, 1996.

*Helen Albright*
Witness

*Kathy Morris*
Witness

FIG. 2

CERTIFICATE OF AUTHENTICITY ←—60

The Central Registrar hereby certifies the the item described herein was signed by John Q. Public, in the presence of an agent of the Central Registrar or that John Q. Public, personally verified to an agent of the Central Registrar that the item described herein displays his signature.

The Central Registrar further certifies that the electronic fingerprint found on the item described herein was issued to John Q. Public. ←—10

Description of Item: Last Will and Testament of John Q. Public dated June 21, 1996

Name of Original Registrant: John Q. Public. ←—62

Date of Original Registration: June 21, 1996 ←—63

Names of Subsequent Registrants and Dates of Subsequent Registrations:
62A—↘_____          _____↙—63A 10A—↘
Names of Present Registrant and Date of Present Registration:
John Q. Public ←—62B   June 21, 1996 ←—63B

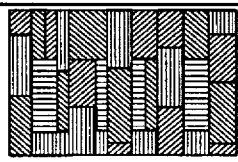
←—30A

DATED: June 21, 1996 ←—64

_____
CENTRAL REGISTRAR ←—90

CERTIF.WPS

FIG. 3

CERTIFICATE OF AUTHENTICITY ← 60A

The Central Registrar hereby certifies that the electronic fingerprint found on the Item described herein was issued to John Q. Public. ← 10

The Central Registrar further certifies that the following information concerning the Item is found in the records of the Central Registrar:

Description of Item: Last Will and Testament of John Q. Public dated June 21, 1996

Name of Original Registrant: <u>Mary S. Public</u> ← 62      \
                                                              61
Date of Original Registration: <u>June 18, 1996</u> ← 63

Names of Subsequent Registrants and Dates of Subsequent Registrations:
62A ── _____          _____ ── 63A
             10B ──\

Names of Present Registrant and Date of Present Registration:
John Q. Public ← 62B    June 21, 1996 ← 63B DATED: <u>June 18, 1996</u> ← 64

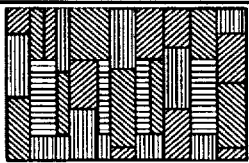 ← 30A

_____ ← 90
CENTRAL REGISTRAR

AUTHENT.WPS

METHOD FOR DETERMINING FORGERIES AND AUTHENTICATING SIGNATURES

BACKGROUND OF THE INVENTION

1. Field of the Invention

The present invention relates to forgery deterrent and authentication systems and methods, and more particularly to forgery deterrent and authentication systems and methods related to signatures.

2. Background Art

Forgery of signatures has been and remains a problem in all aspects of society wherein value is placed on the authenticity of a signature. This is true whether the signature is placed on an important document such as a will or contract or whether the signature is considered to have intrinsic value such as the signature of a celebrity. Indeed, a forger does not always have to be very good in order to be successful.

A system whereby any person whose signature is being protected ("Principal") could deter the forging of his or her signature and obtain authentication of his or her signature by the placement of a unique forgery proof medium next to his or her signature would be useful but is not available today.

An authentication system to guarantee the authenticity of sports memorabilia articles is described in U.S. Pat. No. 5,380,047 dated Jan. 10, 1995 to Molee and Ellis and U.S. Pat. No. 5,267,756 dated Dec. 7, 1993 to Molee and Ellis, both assigned to The Upper Deck Company ("Upper Deck") (collectively "Molee patents"). The Molee patents require that the athlete sign the article being authenticated in the presence of an Upper Deck Authenticated representative. Upper Deck then places a hologram that contains a unique serial number on the article. A certificate of authenticity is then prepared by Upper Deck that contains a hologram identical to the hologram placed on the article. The memorabilia is packaged by Upper Deck with a registration card that gives the purchaser of the article the opportunity to register ownership of the article with Upper Deck.

However, the Upper Deck system is not designed to deter the forgery of signatures or to authenticate signatures generally. It is designed as a marketing tool for Upper Deck to ensure to the sports memorabilia buying public that the articles it is selling are authentic. Upper Deck's main business is the marketing of sports memorabilia, and it therefore has a pecuniary interest in ensuring a continuous supply of the very merchandise it is authenticating. Upper Deck's system is not designed to be used outside its market niche. Further, it requires that the article being authenticated be authenticated in the presence of an Upper Deck representative. Additionally, the serial number on the hologram is in no way unique to the athlete that signed the article but is only unique to the Upper Deck article. Upper Deck's system does not allow for the distribution of the authenticating holograms to athletes for their use when not signing in the presence of an Upper Deck representative.

An object of the present invention is to provide a general forgery deterrent and an authentication system for signatures.

Another object of this invention is to provide the signature with verifiable authentication indicia.

Another object of this invention is to establish a central registrar and data base for electronic fingerprints ("EF") that will encode Personal Identification Number ("PINs") on EFs.

SUMMARY OF THE INVENTION

According to an exemplary embodiment of the present invention, an EF used is one which is a forgery proof diffraction grating pattern or similar information bearing medium. The EF is issued by a central registrar ("CR") to a Principal. The EF is encoded by the CR with the Principal's PIN and a sequentially numbered associated code ("Code") distinct for each EF distributed. The Principal must acknowledge to the CR, through the use of his or her PIN, that he or she has received physical possession of the EFs before the EFs are considered valid. The Principal affixes the EF to any document or other object ("Item") alongside the signature of the Principal. The EF is affixed to the Item with a tamper proof adhesive. After the EF has been placed on an Item by the Principal, the Principal or subsequent person to whom the Principal has directly or indirectly released the Item ("Holder") of the Item has the option of having the Item authenticated and/or registered with the CR by an agent ("Agent") of the CR. A representative of the CR mechanically or optically reads the EF with an illuminated light or other suitable source which recognizes the PIN as having been issued to the Principal whose signature is affixed to the Item. A description of the Item along with the PIN and Code is registered with the CR. The CR then issues a certificate of authenticity ("CA"). If the EF has been affixed to the Item in the presence of an Agent of the CR or if the Principal requests the authentication of the Item, the CA so states. If the CA is requested by a Holder of an Item which has not been previously authenticated by the Principal, the CA verifies that the EF found on the Item was issued to the Principal. The CA describes the Item and the CA itself contains an EF with a PIN and Code identical to the EF affixed to the Item. A record of the ownership of the Item is maintained at the CR. The CR may issue CAs to subsequent Holders of the Item and maintain a record of the transfer of the Item to the subsequent Holder similar to the chain of title to real property maintained by a title policy plant.

DESCRIPTION OF THE DRAWINGS

The nature, objects and advantages of the present invention will become better understood through a consideration of the following description taken in conjunction with the following drawings in which like parts are given like reference numerals and wherein:

FIG. 1 illustrates an exemplary of a portion of an Item comprising a Will showing the signature page having an authentication EF which contains a PIN and a Code;

FIG. 2 illustrates an exemplary certificate of authenticity for the signature of the Principal on the Will in FIG. 1, wherein the placement of the EF on the Will is witnessed by an Agent of the CR or wherein the CA was requested by the Principal;

FIG. 3 illustrates an exemplary certificate of authenticity for the signature of the Principal on the Will of FIG. 1, wherein the placement of the EF on the Will was not witnessed by an Agent of the CR nor wherein the CA was requested by a Holder.

PREFERRED EMBODIMENTS OF THE PRESENT INVENTION

Figure 4:
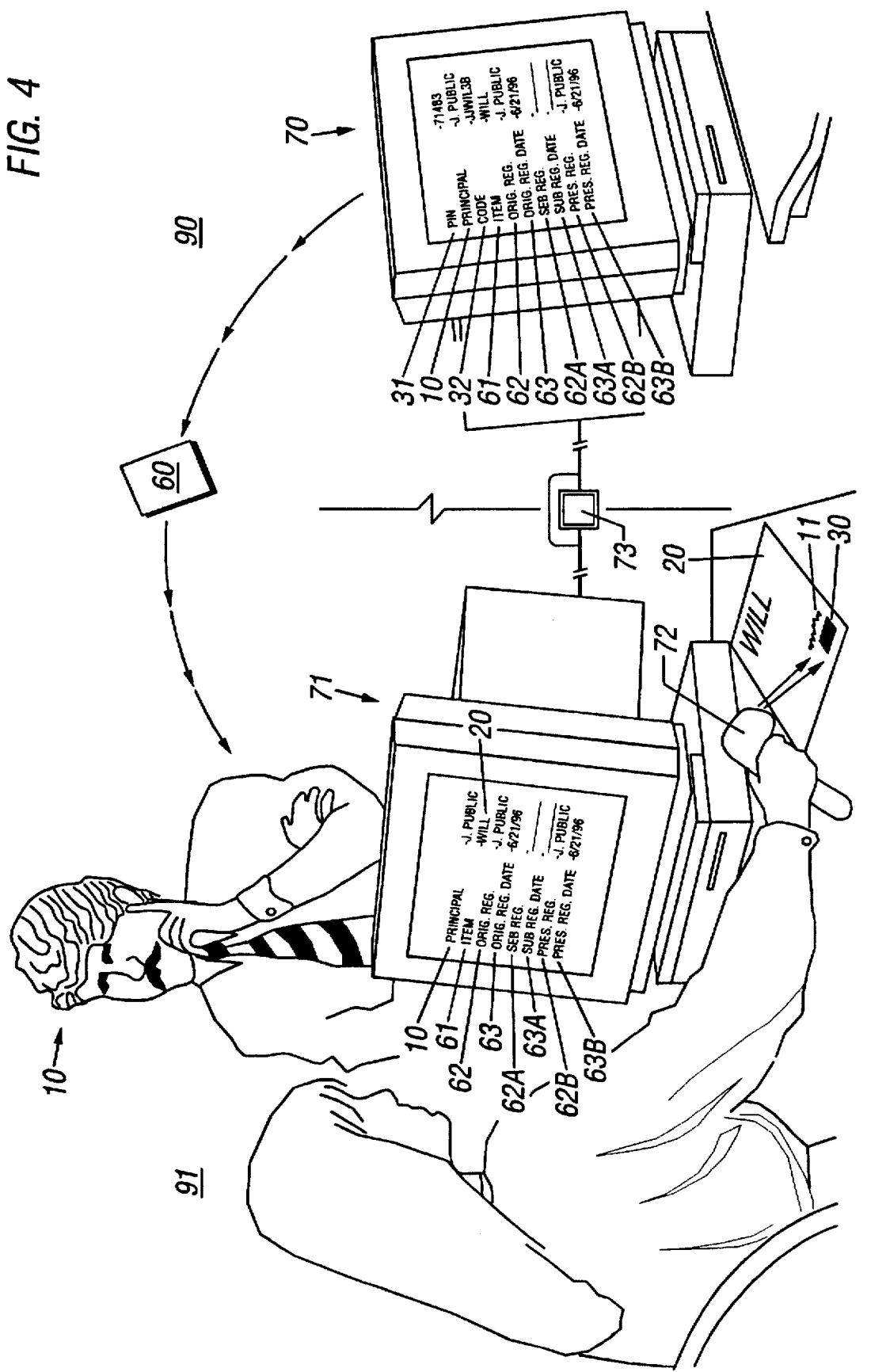
FIG. 4 is a flow diagram of a preferred embodiment of the invention.

The present invention is to enable any person to place his or her own unique EF on any Item at any time to deter forgeries and to authenticate his or her own signature. The present invention does not require that the signing of the Item be witnessed by an Agent of the CR. Because the EF contains a PIN unique to the Principal and also contains a Code unique to the particular EF, it is more secure against forgery. A forger would have to match not only the PIN to the Principal but also the Code to the particular Item onto which the EF was placed in order to complete a forgery.

As a first preferred embodiment, Principal, as depicted by a name, 10 is presumed to desire to utilize a system to verify his or her signature by contacting a CR, depicted by a signature, 90. The CR 90 would issues to the Principal 10 a unique PIN 31. The CR 90 would also encode all EFs 30 issued to the Principal 10 with the PIN 31 of Principal 10 and also sequentially encodes each EF 30 with a unique Code 32. The EFs 30 provided to the Principal 10, preferably by hand delivery of an Agent, have a tamper proof adhesive. Once the Principal 10 obtains physical possession of the EFs 30, he or she must contact the CR 90 and verify through relating his or her PIN 31 that he or she has obtained physical possession of the EFs 30 before the CR 90 will consider the EFs 30 to be valid. After verification by the Principal, the CR 90 will show the delivered EFs 30 to be valid.

An exemplary document in the form of a Last Will and Testament ("Will") 20 is illustrated in FIG. 1. The Will 20 in this example has a Signature 11 thereon of the Principal 10. After the Principal 10 signs his or her Will 20, he or she would affix an EF 30 to the Will 20 in close proximity to the Signature 11. The EF 30 is preferably comprised of a forgery proof diffraction grating pattern, such as shown in U.S. Pat. No. 5,379,131, dated Jan. 3, 1995 to Yamazaki, into which is encoded the Principal's PIN 31 and a Code 32. The EF 30 is affixed to the Will 20 with an adhesive (not shown but as is known in the art) so as to be tamper proof. Once placed, the EF 30 cannot be removed from the Will 20 without destroying the EF 30. The EF 30 cannot be duplicated and the PIN 31 and Code 32 cannot be read without the use of the computer program that encoded them. Therefore the PIN 31 and Code 32 can only be read and recognized by the computer database maintained in the CR 90. Remote reading of the EF 30 by an Agent 91 of the CR 90 is achieved by connecting to the computer database in the CR 90 via a modem.

A Principal 10 desiring to obtain a CA 60 (FIG. 2) of the Signature 11 placed on the Will 20 takes the Will 20 to an Agent 91 of the CR 90 (FIG. 4). The Agent 91 connects the computer 71 of Agent 91 to a computer 70 of CR 90 via modem 73 and mechanically or optically 72 reads the EF 30. The computer 71 of Agent 91 will not display the PIN 31 but will only display the name of the Principal 10. Therefore, the Principal 10 and Agent 91 together will immediately know if the EF 30 confirms that the EF 30 was issued to the Principal 10. Assuming the EF 30 has been issued to the Principal 10 whose signature 11 is subscribed on the Will 20, the Agent 91 describes the Will 20 to the CR 90 so that the Code 32 encoded on the EF 30 and known only to the CR 90 is thereafter associated with the description of the Item 61—the Will 20. The CR 90 prepares a CA 60 (FIG. 2) which contains: the name of the Principal 10, a description of the Item 61, the name of the original Registrant 62, the date of the original registration 63, a place to identify subsequent registrants 62A and subsequent registration dates 63A, the name of the present registrant 62B and present registration date 63B, the date of the issuance 64 of the CA 60 and the name of the CR 90. The CR 90 prepares an EF 30A that is identical to the EF 30 found on the Will 20 and attaches it to the CA 60 with a tamper proof adhesive. The CA 60 is then delivered to the Principal 10. The CA 60 recites that the Principal 10 whose Signature 11 is subscribed on the Will 20 either signed the Will 20 and affixed the EF 30 to the Will 20 in the presence of the Agent 91 of the CR 90 or that the Principal 10 verified to the Agent 91 of the CR 90 that the signature 11 and the EF 30 were his or hers.

As a second preferred embodiment, a Holder 10A of the Will 20 on which an EF 30 has been placed but which has not been previously registered by the Principal 10 desiring to obtain another type of certificate of authenticity 60A (FIG. 3) of the Signature 11 placed on the Will 20 takes the Will 20 to an Agent 91 of the CR 90 (FIG. 4). The Agent 91 connects the computer 71 of Agent 91 to the computer 70 of CR 90 via modem 73 and mechanically or optically 72 reads the EF 30. The computer 71 of Agent 91 will display the name of the Principal 10 to whom the EF 30 had been issued. Therefore, the Holder 10A and Agent 91 will immediately know if the EF 30 confirms that the EF 30 was issued to the Principal 10. Assuming the EF 30 has been issued to the Principal 10 whose Signature 11 is subscribed on the Will 20, the Agent 91 describes the Will 20 to the CR 90 so that the Code 32 encoded on the EF 30 and known only to the CR 90 is thereafter associated with the Will 20. The CR 90 prepares a CA 60A (FIG. 3) which contains: the name of the Principal 10, a description of the Item 61, the name of the original registrant 62, the date of the original registration 63, a place to identify subsequent registrants 62A and subsequent registration dates 63A, the name of the present registrant 62B and present registration date 63B, the date of the issuance 64 of the CA 60A and the name of the CR 90. The CR 90 prepares an EF 30A that is identical to the EF 30 found on the Will 20 and attaches it to the CA 60A with a tamper proof adhesive. The CA 60A is then delivered to the Holder 10A who now becomes the present registrant 62B. The CA 60A recites that the EF 30 affixed to the Will 20 was issued to the Principal 10 whose Signature 11 is found on the Will 20.

A subsequent Holder 10B of the Will 20 can take the Will 20 and the CA 60 (FIG. 2) or CA 60A (FIG. 3) to an Agent 91 who can authenticate both the EF 30 found on the Will 20 and the EF 30A found on the CA 60 or CA 60A. As the Will 20 has already been registered with the CR 90, the computer 71 of Agent 91 would display not only the name of the Principal 10 but also a description of the Item 61, the name of the original registrant 62, the date of the original registration 63, the name of the subsequent registrant 62A and subsequent registration dates 63A, the name of the present registrant 62B and the date of the present registration 63B. The subsequent Holder 10B could then become the present registrant 62B and have a new CA 60A issued in his or her name.

FIG. 4 is a flow diagram illustrating the authentication process described above wherein the Agent 91 mechanically or optically 72 reads the EF 30 and the computer 71 of Agent 91 communicates with computer 70 of CR 90 via a modem 73. The computer 71 of Agent 91 will not display the PIN 31 or the Code 32 but only displays the name of the Principal 10, and if already registered, a description of the Item 61 the Will 20, the name of the original registrant 62, the date of the original registration 63 of the Item 61, the Will 20, the name of subsequent registrants 62A and dates of subsequent registrations 63A, and the name of the present registrant 62B and date of present registration 63B. The database of CR 90 will include the PIN 31 and Code 32 in addition to the name of the Principal 10 and if registered, the name of the Item 61, the Will 20, the name of the original registrant 62, the date of the original registration 63, the name of subsequent registrants 62A and the date of the subsequent registrations 63A, and the name of the present registrant 62B and date of present registration 63B.

Accordingly, the present invention provides Principal 10 with a unique PIN 31 and Code 32 to be used by the Principal 10 to deter forgery of, and to authenticate his or her signature. Principals 10 and Holders 10A, 10B of Items 61 desiring to authenticate the signature of the Principal 10 take the Item 61 to an Agent 91 who mechanically or optically reads the EF 30 attached to the Item 61. Once an Item 61 is authenticated a CA 60, 60A can be issued by the CR 90. The CR 90 can also maintain a record of the chain of title to the Item 61.

Although the preferred embodiment of the invention described above uses a forgery proof diffraction grating pattern, many other information bearing media that are difficult to decode and replicate can also be used. For example a random dot matrix pattern may be used. However whatever method is used it must be capable of cryptically storing information in the form of PINs and Codes that can be read mechanically or optically. All of these media are currently available and can be applied to any Item to which a signature can be applied with a tamper proof adhesive such that attempted removal of the EF will result in destruction of the EF.

It will be apparent to those skilled in the art that the forgery deterrent and authentication system of the present invention may be modified in numerous ways and may assume many embodiments other than the preferred forms specifically set out and described above. Accordingly it is intended by the appended claims to cover all such modifications of the invention which fall within the broad scope of the invention disclosed above.

I claim:

1. A forgery deterrent and authentication system, comprising:
   a. the encoding of a principal's personal identification number and separately numbered codes on an information bearing medium using a central registrar;
   b. the placing of the principal's information bearing medium on items signed by the principal with a tamper proof adhesive;
   c. the authenticating of the principal's information bearing medium through a reeder;
   d. the issuing of a certificate of authenticity of at least one of the items including attaching a duplicate information bearing medium thereto; and
   e. the maintaining of a database containing the record of possession of at least one of the items.

2. The system of claim 1, wherein the information bearing medium includes a forgery proof diffraction grating pattern.

3. The system of claim 2, wherein the diffraction grating pattern includes an optically generated diffraction pattern.

4. The system of claim 2, wherein the diffraction grating pattern includes a mechanically generated diffraction pattern.

5. The system of claim 1, wherein the information bearing medium includes a forgery proof random dot matrix pattern.

6. The system of claim 1, wherein the information contained on the principal's information bearing medium and the information on the duplicate information bearing medium are identical.

7. The system of claim 1, wherein there is further included:
   f. the accessing of the identity of the principal assigned to the personal identification number encoded on the information bearing medium by an agent of the central registrar.

8. The system of claim 1, wherein the record of possession includes a record of the issuance of the certificates of authenticity.

9. The system of claim 1, wherein the information bearing medium includes individual pieces for a principal, each piece having the personal identification number of the principal and a separately numbered one of the separately numbered codes.

10. The system of claim 9, wherein the separately numbered one of the separately numbered codes is a unique code.

11. The system of claim 10, wherein the separately numbered codes are sequentially numbered.

12. The system of claim 10, wherein the issuing of the certificate of authority includes:
   g. the entering of a description of the item corresponding to the separately numbered code in the database.

13. The system of claim 12, wherein there is further included:
   h. the providing of accessibility of portions of the database to an agent.

14. The system of claim 13, wherein the description of the item assigned to the code encoded on the information bearing medium is accessible to the agent.

15. The system of claim 14, wherein the agent acts with the central registrar.

16. The system of claim 1, wherein the item includes a signature.

17. The system of claim 16, wherein the item includes a will.

18. Apparatus for a forgery deterrent and authentication system for a principal having items, comprising:
   a. an information bearing medium;
   b. a central registrar;
   c. a first set of codes, each code corresponding to a principal personal identification number;
   d. a second set of separately numbered codes;
   e. encoding means for encoding information including said principal's personal identification number and said separately numbered codes on said information bearing medium using said central registrar;
   f. a tamper proof adhesive;
   g. placement means for placing of said principal's information bearing medium on the items with said tamper proof adhesive
   h. a reader;
   i. authentication means for authentication of said principal's information bearing medium through said reader
   j. a certificate of authenticity, said certificate corresponding to at least one of the items, said certificate including duplicate information bearing medium attached thereto having second information; and
   k. a database having means for maintaining said database, said database containing records of possession of at least one of the items.

19. The apparatus of claim 18, wherein said information bearing medium includes a forgery proof diffraction grating pattern.

20. The apparatus of claim 19, wherein said diffraction grating pattern includes an optically generated diffraction pattern.

21. The apparatus of claim 19, wherein said diffraction grating pattern includes a mechanically generated diffraction pattern.

22. The apparatus of claim 18, wherein said information bearing medium includes a forgery proof random dot matrix pattern.

23. The apparatus of claim 18, wherein said information contained on said principal's information bearing medium and said information on said information bearing medium are identical.

24. The apparatus of claim 18, wherein an agent is used and there is further included:
l. access means for accessing the identity of the principal assigned to said personal identification number encoded on said information bearing medium by the agent.

25. The apparatus of claim 18, wherein said record of possession include a record of the issuance of said certificates of authenticity.

26. The apparatus of claim 18, wherein said information bearing medium includes individual pieces for the principal, each piece having said personal identification number of the principal and a separately numbered one of said separately numbered codes.

27. The apparatus of claim 26, wherein said separately numbered one of the separately numbered codes is a unique code.

28. The system of claim 27, wherein said separately numbered codes are sequentially numbered.

29. The apparatus of claim 27, wherein there is further included:
m. enter means for entering a description of the item corresponding to said separately numbered code in said database.

30. The apparatus of claim 29, wherein an agent is used and wherein there is further included:
n. access means for providing availability of portions of said database to the agent.

31. The apparatus of claim 30, wherein said description of the item assigned to said code encoded on said information bearing medium is accessible to the agent.

32. The apparatus of claim 31, wherein the agent acts with said central registrar.

33. The apparatus of claim 18 wherein the item includes a signature and said authentication means includes means for verifying the signature.

34. A forgery deterrent and authentication method for signatures, comprising the steps of:
a. registering the principal with a central registrar that issues to the principal an information bearing medium that includes an encoded personal identification number and a second numbered code;
b. placing the information bearing medium on an item by the principal next to the principal's signature with a tamper proof adhesive;
c. reading of the principal's information bearing medium placed on the item using the central registrar;
d. identifying the principal through the principal's personal identification number by the central registrar;
e. identifying of the item through the second numbered code by the central registrar;
f. providing a certificate of authenticity by the central registrar including thereon a second information bearing medium with an identical personal identification number and second numbered code; and
g. maintaining a database that identifies principals, items, the current known holder of an item and the date of issuance of a certificate of authenticity.

35. The method of claim 34, wherein step c is performed by an agent.

36. The method of claim 34, wherein step d is performed by an agent.

37. The method of claim 34, wherein step e is performed by an agent.

* * * * *